No. 659,345. Patented Oct. 9, 1900.
C. E. IVINS.
BEATER.
(Application filed Apr. 21, 1900.)
(No Model.)
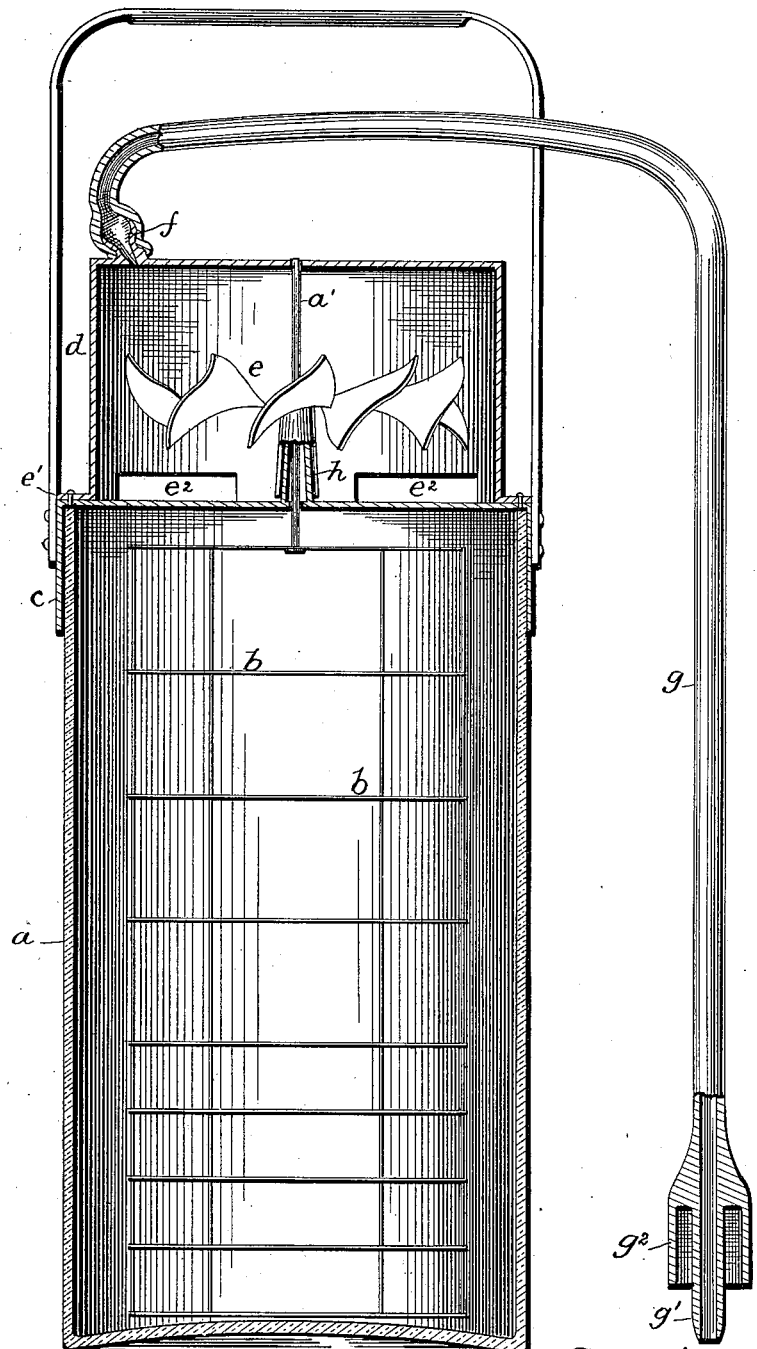

UNITED STATES PATENT OFFICE.

CLIFFORD E. IVINS, OF GLENOLDEN, PENNSYLVANIA.

BEATER.

SPECIFICATION forming part of Letters Patent No. 659,345, dated October 9, 1900.

Application filed April 21, 1900. Serial No. 13,808. (No model.)

*To all whom it may concern:*

Be it known that I, CLIFFORD E. IVINS, a citizen of the United States, residing at Glenolden, in the county of Delaware and State of Pennsylvania, have invented a certain new and useful Beater, of which the following is a specification.

It is one object of this invention to provide a beater for beating eggs, whipping cream, and the like; and to this end the invention, stated in general terms, consists of a receptacle having a dasher or beater and a motor, which is constructed to operate the dasher or beater by water-power, a further object being to utilize the waste water to cool the contents of the receptacle while being agitated.

The nature, characteristic features, and scope of the invention will be more fully understood from the following description, taken in connection with the accompanying drawing, forming part hereof, and in which I have illustrated in central section a beater embodying features of my invention.

Egg and other beaters, such as are commonly used in households, restaurants, and hotels, have heretofore been operated by hand, which not only consumes much time, but is very fatiguing. In order to overcome these disadvantageous features, I have constructed an automatic beater which can be operated by water-power, compressed air, or the like. Since the beater can be attached, for instance, to a spigot in the kitchen and left to operate while attending to some other duty, it follows that both a saving in time and labor must ensue.

In the drawing, $a$ is a receptacle of any preferred shape and material—for instance, a glass jar—adapted to contain eggs, cream, and the like. Mounted on a shaft $a'$ is a dasher or beater $b$, which for the sake of illustration is shown as constructed of wire, although any form of beater would answer the same purpose. Fitting snugly to the upper portion of the receptacle $a$ is a cover $c$, which serves to prevent water from entering the receptacle and also serves to keep the contents of the receptacle, while in the process of agitation, from escaping. The cover $c$ may be provided with a handle and also a hood $d$. The hood $d$ is constructed to receive a motor or water-wheel $e$, also mounted on the shaft $a'$, which can be of any of the well-known types of wheels and the type of which is not material to this invention. This wheel is adapted, through the instrumentality of water supplied from a spigot or other appropriate place, to operate the dasher or beater at a high rate of speed. The hood $d$ is provided with feet $e'$ and openings $e^2$, which permit of the escape of the waste water, which runs down over the sides of the receptacle and serves to cool the contents of the same, which is an advantageous feature. Leading to the hood is a hose $g$, having a spigot attachment or coupling, which may consist of an extension $g'$, adapted to fit inside the spigot, and a skirt portion $g^2$, which is adapted to fit around the outside of the spigot. Extending from the hood, preferably at an inclination, in order to properly strike the blades of the wheel, is a nozzle $f$, adapted to receive the other end of the hose. Between the motor or wheel and the cover $c$ is a gland or water-excluding packing $h$, which serves to exclude water from the interior of the receptacle $a$.

In operation, the receptacle $a$ having been supplied with suitable material, the cover $c$ is fitted to the receptacle and the hose $g$ attached to a spigot. Water coming under pressure such as is supplied in the water-mains and striking the blades of the wheel at an inclination rotates the shaft $a'$ and its dasher or beater $b$ at a high rate of speed, which, in a few seconds, produces excellent results. The beater shown in the drawing is especially adapted for household use, where it is merely necessary to attach it to the spigot in the sink, turn on the water, and while attending to some other duties obtain those results which ordinarily would have involved much time and labor. However, in restaurants and hotels, where a beater of a much larger size is needed, and where compressed air and the like is obtainable, the same results could be produced.

It will be obvious to those skilled in the art to which the invention appertains that modifications may be made in details without departing from the spirit thereof. Hence I do not limit myself to the precise construction and arrangement of parts hereinabove set forth, and illustrated in the drawings; but,

Having thus described the nature and objects of the invention, what I claim as new, and desire to secure by Letters Patent, is—

1. The combination of a beater and its receptacle, a rotary motor for the beater, and a hood having inlet and outlet connections penetrating it, the arrangement of the outlet connections being such that the medium which drives the motor is adapted to escape in contiguity with the receptacle and cool the contents thereof, substantially as described.

2. The combination of a beater and its receptacle, a rotary motor for the beater having a casing removably attached to the receptacle, inlet connections for supplying fluid to the motor, and discharge-outlets therefor, the arrangement being such that the waste fluid is adapted to run down over the sides of the receptacle and cool the contents thereof, substantially as described.

In testimony whereof I have hereunto signed my name.

CLIFFORD E. IVINS.

In presence of—
W. J. JACKSON,
FRANKLIN T. KALAS.